Sept. 10, 1946. H. M. HART 2,407,272
METHOD AND APPARATUS FOR RADIO RANGING
Filed March 20, 1941 3 Sheets-Sheet 1

INVENTOR
HAROLD M. HART
BY
ATTORNEY

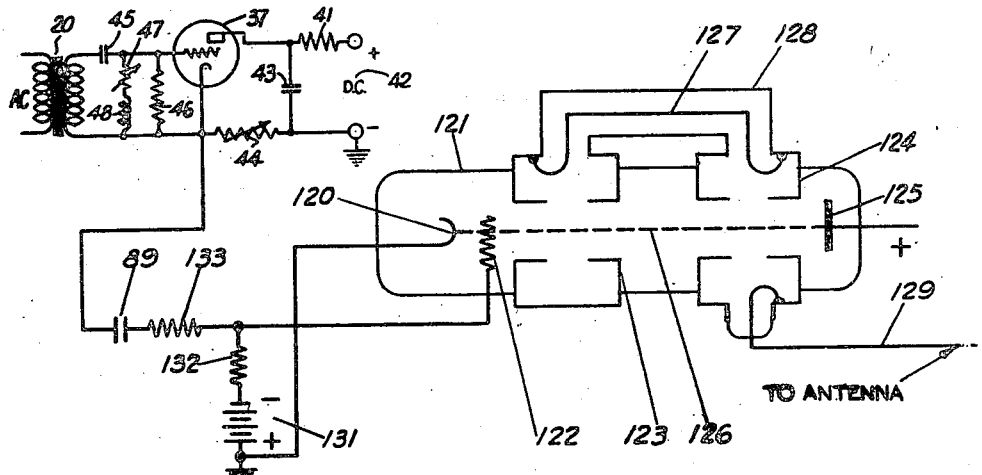
Fig. 7
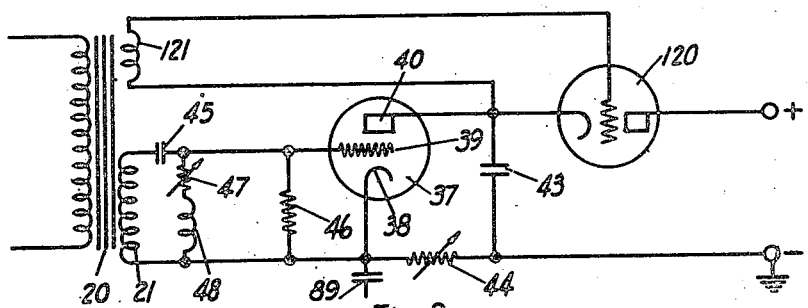
Fig. 8
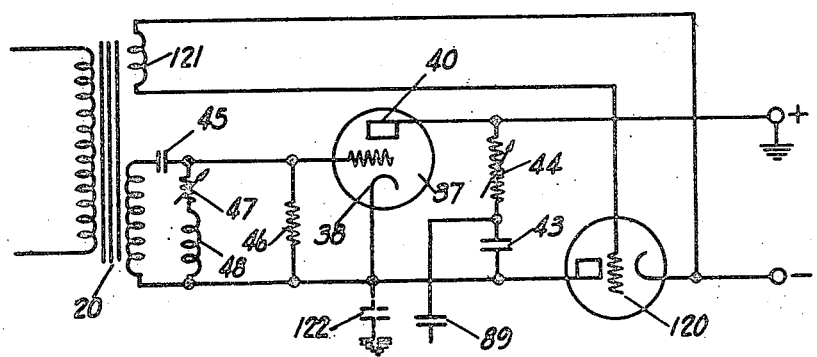
Fig. 9
INVENTOR
HAROLD M. HART
BY
ATTORNEY Patented Sept. 10, 1946

2,407,272

UNITED STATES PATENT OFFICE 2,407,272

METHOD AND APPARATUS FOR RADIO RANGING

Harold M. Hart, Cambridge, Mass., assignor, by mesne assignments, to Submarine Signal Company, Boston, Mass., a corporation of Delaware Application March 20, 1941, Serial No. 384,353

4 Claims. (Cl. 315—3)

The present invention relates to radio echo ranging systems, and more particularly to methods and apparatus for producing an electromagnetic wave impulse, synchronizing the production of the same with an indicating device and for indicating received signals.

It has heretofore been proposed to transmit a short electromagnetic wave impulse and to measure the time interval elapsing between the emission of the impulse and the receipt of an impulse or echo reflected from an object whose distance is to be determined. It has also been proposed to employ a cathode ray tube to indicate the receipt of a reflected impulse and to measure the time interval between the transmitted and reflected impulses, thereby obtaining a measure of the distance.

It is an object of the present invention to provide improved methods and apparatus for radio echo ranging.

It is a further object of the present invention to provide improved methods and apparatus for generating an electromagnetic wave impulse of suitably short time length and high power and to maintain a high degree of accuracy in the length of the time interval between periodically emitted impulses.

A further object of the invention is to provide an improved cathode ray tube indicator and further to provide such an indicator in which the cathode ray beam is subjected to a field tending to cause the beam to produce a truly circular trace on the fluorescent screen.

A further object of the invention is to provide a method and apparatus whereby the production and emission of the wave impulse can be accurately synchronized with the beam-rotating field of the cathode ray tube and moreover whereby the emission of the impulse can be made to occur at any desired instant with respect to the cathode ray beam rotating field.

A further object of the invention is to provide a cathode ray tube indicator whose full-scale range can conveniently be varied.

Figure 1:
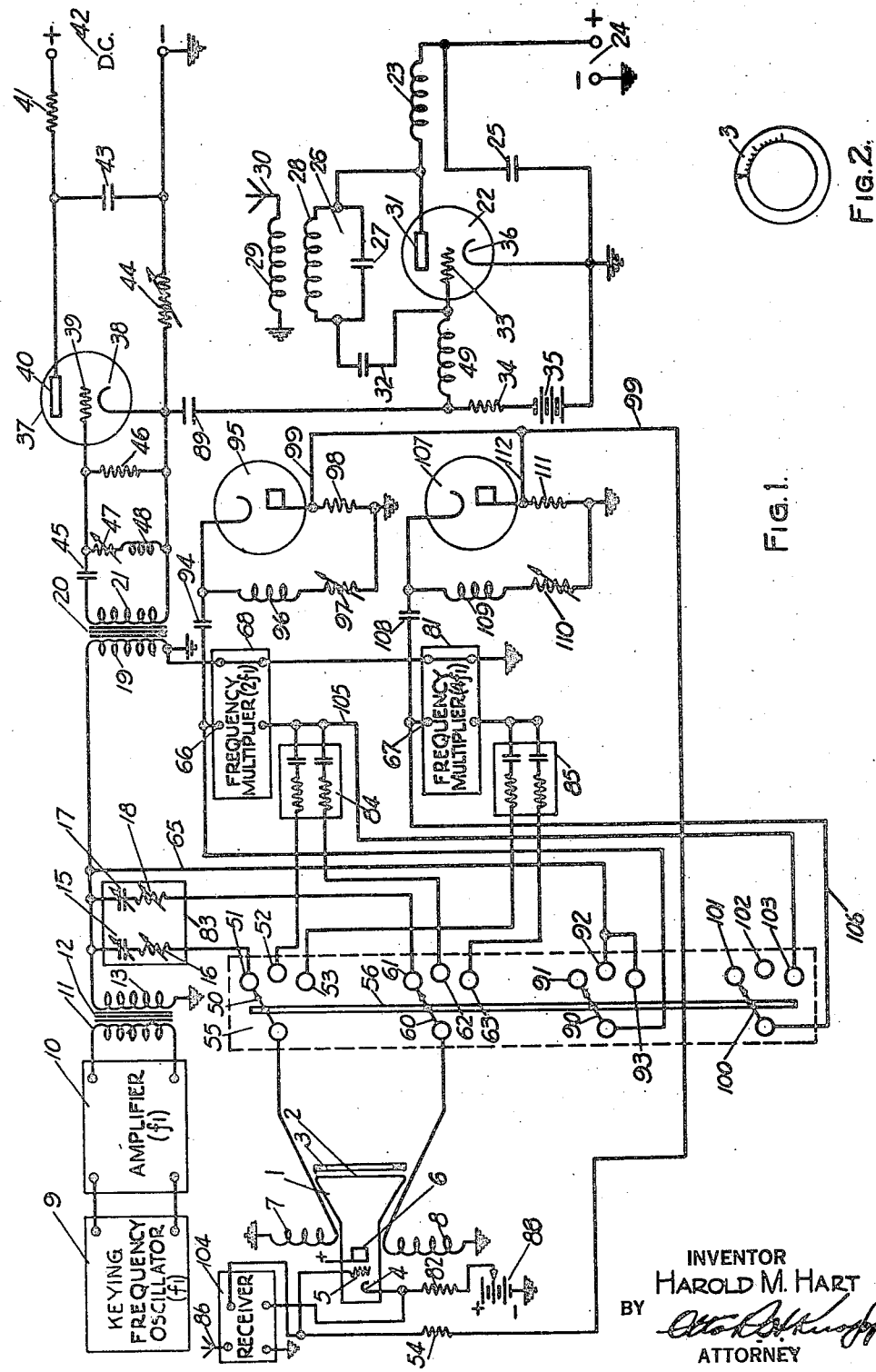
Figure 2:
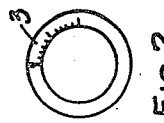
Figure 3:
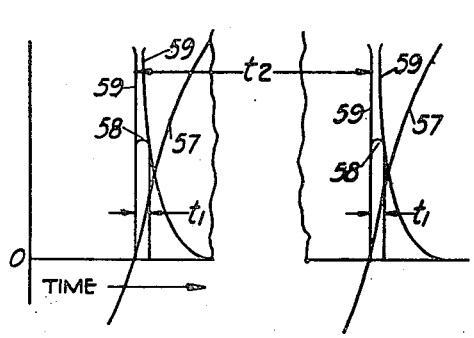
Figure 5:
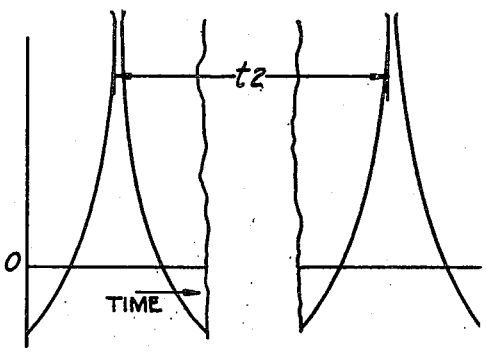
Figure 4:
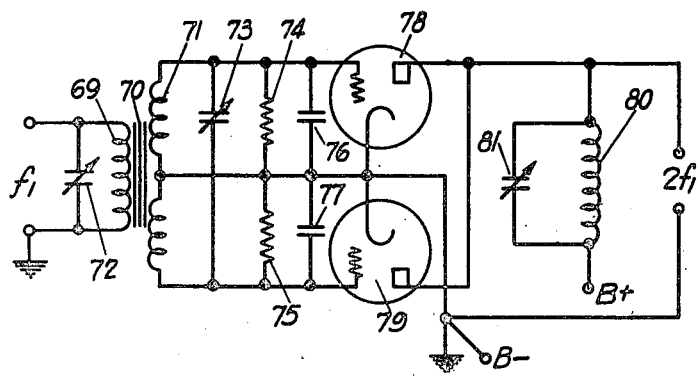
Figure 6:
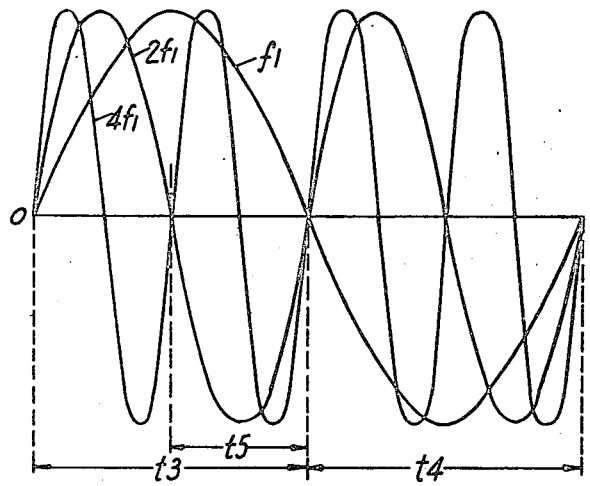

The above and other objects of my invention will best be understood from the following description taken in connection with the accompanying drawings in which Fig. 1 is a schematic diagram of the circuits and apparatus involved in the invention; Fig. 2 is a front elevation of the cathode ray tube indicator scale which is shown in vertical section in Fig. 1; Fig. 3 is a graph illustrating features of the invention; Fig. 4 is a schematic diagram of a form of frequency multiplier used in Fig. 1; Figs. 5 and 6 are further graphs illustrating features of the invention; Fig. 7 is a schematic diagram of a modification of a portion of Fig. 1; and Figs. 8 and 9 are schematic diagrams of modifications of the keying circuit shown in Fig. 1.

A suitable form of my invention is shown in Fig. 1 of the drawings in which in general a cathode ray tube indicator is provided with a deflecting field tending to cause the cathode ray beam to produce a circular trace on the fluorescent screen at a suitable predetermined speed of rotation corresponding to the frequency or a multiple of the frequency of an alternating current generated by a suitable oscillator. This same alternating current brings about a periodic discharge of a condenser through a gaseous discharge tube to permit another oscillator to energize a transmitting antenna for a short period of time in each cycle of the controlling frequency. The reflected wave is received and caused to produce an indication by means of a cathode ray tube.

More specifically the system is as follows: A cathode ray tube 1 is provided with a fluorescent screen 2 adjacent which there may be arranged a scale 3 calibrated in units of distance. The cathode ray tube is also provided with cathode, grid and anode electrodes 4, 5 and 6, respectively, and coils 7 and 8 for producing a suitable magnetic field for deflecting the cathode beam. In place of the coils 7 and 8 electrostatic deflecting electrodes may, of course, be used as is well known in the art, but I prefer to use a magnetic deflecting field because of the ease of controlling the cathode beam in accordance with a feature of my invention as hereinafter described. The coils 7 and 8 are energized from a sweep circuit in such a way as to cause the cathode beam to produce a circular trace on the fluorescent screen adjacent to the scale 3 when the grid 5 is sufficiently positive to permit the beam to pass to the screen.

For generating the rotating field and synchronously controlling the periodic transmission of signal impulses an oscillator 9 and amplifier 10 are provided which produce an alternating current having a frequency equal to the desired rate of emission of successive periodic signal impulses, for example, a frequency of 5000 cycles per second. This current is fed into the primary 11 of transformer 12 having a secondary winding 13 which is connected to a sweep circuit 83. The sweep circuit 83 comprises a condenser 15 and a resistance 16 connected in series and through contacts 51 and 50 of a four-pole three-position switch 55 in series with the deflecting coil 7 and thence through ground back to the transformer 13. In parallel with this circuit is another similar series circuit comprising a condenser 17 and a resistance 18 connected in series and through contacts 61 and 60 of switch 55 in series with the other deflecting coil 8 and through ground back to the secondary of transformer 13. The currents through the two deflecting field coils are in quadrature with each other. Each of these deflecting circuits is tuned to resonance by means of the condensers. By doing this, all harmonics are eliminated so that the traces of the cathode ray will be smooth, symmetrical figures. Furthermore, with this arrangement there is no necessity for using a high grade class A amplifier at 10 as has heretofore been required. By varying the values of resistance in these two circuits, currents of the proper amplitude and phase relation can be made to pass through the coils 7 and 8 whereby the normal trace of the cathode ray beam on the fluorescent screen 2 can be made to be a true circle of the desired diameter. Having determined the proper values, the condensers and resistances may, of course, be fixed in magnitude.

The cathode beam is thus caused to tend to rotate at the same frequency as that of the keying frequency oscillator. Since a frequency of beam rotation of 5000 revolutions per second corresponds for echo ranging to a full scale reading of 18.5 miles on the scale 3, short distances may not be ascertained with sufficient accuracy. If the keying frequency is less than 5000 revolutions, the condition becomes even worse. It may, therefore, often be desirable to expand the scale of the indicator by changing its range. It is, however, necessary at the same time to preserve synchronization between the rotation of the cathode beam and the transmission of the signal impulses. This can, of course, be accomplished simply by increasing the keying frequency and using the increased keying frequency to control the cathode beam sweep as with the lower frequency. It often happens, however, that it is inconvenient or difficult, if not impossible, to increase the keying frequency while at the same time maintaining the necessary accuracy in signal length and time interval between successive signals at the desired power output.

The present invention makes possible the changing of the range of the indicator without any change in the impulse transmission rate. In other words, the keying rate of the high frequency oscillator may be made much lower than the rate of rotation of the cathode beam of the indicator. Thus, the indicator can be read to a greater accuracy than if the cathode beam were rotated at the same frequency as the periodic impulse transmission frequency, as was heretofore necessary in this type of radio echo distance measuring systems. However, since this arrangement results in the transmission of signals at a lower rate than the rate of rotation of the cathode beam, so that a signal may be transmitted in, say, only every alternate or every fourth revolution of the cathode beam, a further feature of the present invention prevents the operation of the cathode beam indicator by noise and/or signals during the unused revolutions of the beam deflecting field by completely suppressing the beam during such revolutions.

To this end one or more frequency multipliers energized from the keying frequency oscillator are used to produce alternating currents of the proper frequency to rotate the cathode beam at the desired speed. Simultaneously rectified impulses of the proper frequency and polarity are impressed upon the grid of the cathode ray tube indicator to suppress the beam at the proper intervals.

As illustrated, a four-pole, three-position switch 55 operated by the switch bar 56 is provided to make the proper connections for the changes in the range of the indicator. The switch 55 comprises four movable brushes 50, 60, 90 and 100, respectively, each adapted to make contact with three stationary studs as shown. Thus, as illustrated in the drawings, the switch is in its initial position, the brush 50 being connected to stud 51 and the brush 60 to stud 61 whereby the deflecting field coils 7 and 8 of the cathode ray tube 1 are energized to rotate the cathode beam at a rate equal to the keying frequency. Under these conditions the brushes 90 and 100 are respectively connected to studs 91 and 101 which are not connected to anything and therefore these two poles of the switch are inactive in this position.

In the second position of the switch the brush 50 is connected to stud 52, brush 60 to stud 62, brush 90 to stud 92, and brush 100 to stud 102. Stud 102 is dead so that this part of the switch is inactive. In this second position of the switch energy of the keying frequency as produced in the secondary 13 of the transformer 12 is conducted by lead 65 through stud 92 and brush 90 of the switch 55 to the input terminal 66 of a frequency multiplier 68 which in this case is a frequency doubler. Energy of the keying frequency is also applied to a diode rectifier 95 through a phase-adjusting circuit comprising a series condenser 94 and an inductance 96 and resistance 97. The cathode of the rectifier is connected to the condenser 94 while the anode of the rectifier is connected through a resistance 98 to ground. A conductor 99 leads from the anode of the tube through a resistance 54 to the grid 5 of the cathode ray tube indicator 1. The output of the frequency multiplier 68 is connected through the sweep circuit 84 which, like the sweep circuit 83, comprises two suitable series-connected resistance and condenser combinations. One of these is connected to the stud 52 of the switch 55 and thence by way of brush 50 to the deflecting coil 7, and the other is connected to the stud 62 and through brush 60 to the other deflecting coil 8. Thus, assuming the output of the frequency multiplier 68 to be twice the keying frequency, the deflecting coils 7 and 8 will produce a beam-deflecting field, tending to rotate the beam at twice the keying frequency. Since, however, the grid 5 of the cathode ray tube is energized with a negative potential produced by the passage of the negative half cycles of the keying frequency through the diode 95, the cathode beam will be completely suppressed during every alternate revolution of the beam-deflecting field produced by the coils 7 and 8, that is during the non-keying revolutions.

In connection with this suppression of the cathode beam it should be noted that the cathode 4 of the indicator tube 1 is connected to a resistance 82 and battery 88 to ground. The potential provided by the battery 88 initially biases the grid 5 negatively with respect to the cathode so that a partial suppression of the cathode beam is obtained whereby its trace on the fluorescent screen 2 is made to be quite dim. When there is no other beam-suppressing potential on the grid 5, signal energy received on the antenna 86 and passed by the receiver 104 to the grid 5 of the indicator will make the grid sufficiently positive so as to overcome the initial negative bias provided by the battery 88 and produce a bright indication in the form of a bright spot on the screen 2. However, when the switch 55 is in its second position so that the deflecting field rotates the beam at twice the keying frequency, the grid 5 will be made highly negative by the potential provided by diode 95 during every alternate revolution of the cathode beam and thus the latter will be completely suppressed during these alternate revolutions and no indications will be produced in response to signals picked up by the antenna. During the other revolutions of the beam the keying frequency will, however, be in its positive half cycle, at the beginning of which it will actuate the high frequency impulse transmitter, as further explained below. None of the positive half cycles of the keying frequency will, however, be passed by the diode 95 so that the grid 5 of the cathode ray tube indicator will only be slightly negative as determined by the bias provided by the battery 88. The indicator tube 1 is therefore in condition to produce an indication if an echo or other signal should be received by the receiver 104 during these positive half cycles of the keying frequency. Thus, for the second position of switch 55, the full-scale range of the indicator is one-half of its range in the first switch position.

In the third position of the switch 55, brush 50 will be connected to stud 53, brush 60 to stud 63, brush 90 to stud 93 and brush 100 to stud 103. The studs 92 and 93 are connected together so that in the third position of the switch the frequency multiplier 68 will still be active as will the diode 95. Some of the energy from the multiplier 68 is conducted by the lead 105 through stud 103, brush 100 and lead 106 to a second frequency multiplier 81. In the present case this also is a frequency doubler whose output will thus be four times the frequency of the keying frequency oscillator. The output of multiplier 81 is fed through a sweep circuit 85 which again is similar to the sweep circuit 83 and composed of two series-connected resistance and condenser combinations of the proper magnitude for the frequency in question. One of these resistance-condenser combinations is connected through the stud 53 and brush 50 to the deflecting-field coil 7 of the cathode ray indicator, while the other is connected through stud 63 and brush 60 to the other deflecting-field coil 8. The magnetic deflecting field is therefore such as to tend to rotate the cathode beam at four times the keying frequency. Since, as will be further explained below, a high frequency signaling impulse is transmitted at the beginning of each cycle of the keying frequency, there will be an impulse transmitted at the beginning of every fourth revolution of the cathode beam. In the two revolutions of the cathode beam just preceding the transmission of a signal impulse, the grid 5 of the cathode ray indicator will be biased negatively so as completely to suppress the beam since the diode 95 is still operative when the switch 55 is in the third position.

It is desired, however, also to prevent stray signal indications in the second revolution of the cathode beam following the revolution at the beginning of which the ranging signal impulse is transmitted. To this end another diode 107 is provided which functions in substantially the same manner as the diode 95. It is energized, however, by the output of the frequency multiplier 68 so that it will pass current during each negative half cycle of the output of the multiplier 68. The cathode of the diode 107 is connected to the multiplier 68 by way of lead 105, switch stud 103, brush 100, lead 106 and a phase-adjusting circuit comprising a condenser 108, an inductance 109 and a resistance 110. The anode of the diode 107 is connected through a resistance 111 to ground. A conductor 112 joins the anode to the conductor 99 which leads to the grid 5 of the cathode ray tube 1. The diode 107 is thus connected in parallel with the diode 95. The grid 5 of the cathode ray indicator 1 is therefore provided with a beam-suppressing potential during both the negative half cycles of the keying frequency and during the negative half cycles of twice the keying frequency, produced by the multiplier 68. The grid 5 is therefore sufficiently positive to enable the cathode beam to produce an indication only during every fourth complete cycle of the frequency produced by the multiplier 81 and this complete cycle corresponds to the first half of the positive half cycle of the keying frequency at the beginning of which a high frequency signal impulse is emitted. Thus, for the third switch position the full-scale range of the indicator is one-fourth its range in the first switch position.

The relative time intervals involved can be visualized from Fig. 6 which represents a graph of one cycle of the keying frequency $f_1$, two cycles of the output of multiplier 68 designated as $2f_1$ and four cycles of the output of multiplier 81 designated as $4f_1$. The positive half cycle of the keying frequency $f_1$ occupies the time interval $t_3$ and the negative half cycle occupies the time interval $t_4$. It is at the beginning of the time interval $t_3$ that the high frequency ranging signal impulse is transmitted. In the first position of switch 55, which is that shown in Fig. 1, the cathode beam is rotated in synchronism with the frequency $f_1$ so that the indicator will be active to indicate received impulses during the entire cycle of the keying frequency, namely during both $t_3$ and $t_4$. In the second position of switch 55 the cathode beam is rotated in synchronism with the frequency $2f_1$ and the high frequency ranging impulse is transmitted at the beginning of the first positive half cycle of this frequency, namely at the beginning of the interval $t_3$ as before. The beam of the cathode ray indicator is, however, suppressed during the negative half cycle of the frequency $f_1$, namely during the interval $t_4$ so that the cathode ray indicator is active only during one complete cycle of the frequency $2f_1$, namely the interval $t_3$. In the third switch position the cathode beam is rotated in synchronism with the frequency $4f_1$. The cathode beam in this case is suppressed not only during the interval $t_4$ but also during the interval $t_5$ which corresponds to the first negative half cycle of the frequency $2f_1$. The indicator is therefore active only during the first complete cycle of the frequency $4f_1$. In Fig. 6, the various phases have been adjusted to be as shown by adjustment of the resistors 47, 97 and 110.

While it is desirable, as above described, to make the cathode ray indicator inactive during the cathode beam revolutions in which no signal is transmitted, it will be understood by those skilled in the art that it is not essential to do this and that the diodes 95 and 107 may, therefore, be omitted, if desired. Further, if such beam suppression is not to be used, it will not be necessary to make the frequency multipliers 68 and 81 in the form of frequency doublers but odd harmonic multipliers could be used if desired. I prefer, however, to make the frequency multipliers in the form of doublers and to use them in combination with the beam-suppressing circuits as described. While I have shown only two cascaded frequency multipliers providing three different ranges for the cathode ray indicator, it will be understood that more than two can be used providing as many ranges as may be desired and also providing automatic beam-suppressing action during the unused revolutions of the cathode beam.

Suitable forms of frequency multipliers or of frequency doublers are well known in the art. For purposes of illustration, however, a conventional push-pull type of frequency doubler is diagrammatically shown in Fig. 4. The original frequency $f_1$ is fed into the primary 69 of transformer 70 having center-tapped secondary 71. The transformer primary is tuned by condenser 72 and the secondary by condenser 73. Resistors 74 and 75 are shunted across the two halves of secondary 71, as are also condensers 76 and 77 which serve as a low impedance path for any second harmonic present in the input circuit. Two triodes 78 and 79, operating as a push-pull doubler, have their cathodes connected together and to the center tap of secondary 71, while their grids are respectively connected to the extremities of secondary 71. The anodes of the triodes are connected together and through inductance 80, which may form the primary of the input transformer for a second stage of multiplication, to the positive terminal of the anode voltage supply. The inductance 80 is tuned by condenser 81 to the second harmonic of the input frequency. Thus, there is produced a frequency of twice the input frequency.

For the synchronous production of a high frequency ranging impulse, a portion of the current produced by the keying frequency oscillator in the secondary 13 is also fed into the primary 19 of a transformer 20 having a secondary winding 21 for the control of the keying or impulse-transmitting circuit. This includes an oscillator tube 22 which may be a more or less conventional high frequency three-electrode vacuum tube oscillator with suitable control and output circuits or it may be an oscillator of the velocity modulation type or any other desired type of electromagnetic wave generator. As illustrated in Fig. 1, the oscillator comprises a modified Colpitts type circuit having a three-electrode vacuum tube 22 whose anode circuit includes an inductive choke 23 and voltage source 24 shunted by a bypass condenser 25. The anode output circuit includes a tuned tank circuit 26 comprising condenser 27 and inductance 28 which may be the primary of an output transformer having a secondary winding 29 connected to an antenna 30 and ground. The tank circuit 26, in addition to being connected to the anode 31 of the tube 22, is also connected through a series blocking condenser 32 to the grid 33. The input circuit of the tube 22 comprises a resistance 34 connected in series with a battery 35 and a high frequency choke 49 between the grid and cathode of the tube. The battery 35 is adjusted to maintain the grid 33 at a potential just sufficient to prevent oscillation except when an impulse is to be transmitted. When an impulse is to be transmitted, a control voltage is applied between the grid and cathode of the tube 22 obtained from an impulse-producing circuit which, in turn, is controlled by the keying frequency oscillator 9.

The impulse-producing circuit comprises a gaseous discharge tube 37 having a cathode 38, grid 39 and anode 40. The anode 40 is connected through series resistance 41 to the positive terminal of a suitable direct current source 42. The anode 40 is also connected through a condenser 43 and a variable series resistance 44 to the cathode 38. The junction of the condenser 43 and resistance 44 is connected to the negative terminal of the source 42. The condenser 43, which is charged from the direct current source through resistance 41, thus supplies electric energy which is discharged through the resistance 44 when the tube 37 becomes conductive. The grid 39 is connected to the cathode 38 by means of a resistance 46. The voltage of the secondary 21 of the transformer 20 is impressed across the resistance 46 through a phase-shifting circuit which comprises the series condenser 45 and a variable resistance 47 which is connected in series with an inductance 48, the resistance and inductance together being shunted across the secondary 21. The voltage drop across resistor 44 due to the condenser discharge through the tube is impressed on the grid 33 of the high frequency oscillator 22 through the cathode ground connections and blocking condenser 89 and high frequency choke 49 which has a low impedance to the keying impulse. The time length of the keying impulse is determined by the time constant of the discharge circuit formed by condenser 43 and resistor 44.

The operation is as follows. The keying frequency produced by the oscillator 9 is, with switch 51 in the position shown in Fig. 1, impressed upon the cathode ray tube coils to produce a rotating deflecting field for the cathode ray beam in the tube 1. The same frequency is also impressed upon the grid 39 of the tube 37 in a relative phase, depending upon the values of condenser 45, resistance 47 and inductance 48. By varying the magnitude of resistance 47 the phase relation between the voltage applied to the grid 49 and the voltages applied to the deflecting coils 7 and 8 for the first position of switch 55 can be controlled. By this means the particular instant of emission of the signal impulse with regard to the instantaneous position of the cathode beam as determined by the field produced by the deflecting coils 7 and 8 can be controlled. The system can, therefore, readily be adjusted so that the signal is transmitted exactly at the instant the cathode ray is at the zero point of the scale 3, and this is true regardless of the cathode beam rotation frequency. When the switch 55 is in its second position so that the cathode beam is rotating at twice the keying frequency, the particular instant of emission of the signal impulse with reference to the instant at which the cathode beam is at the zero position of the scale is likewise controlled by varying the magnitude of resistance 47. In this case it is also necessary, however, to control the relative time phase in which the beam-suppressing potential is applied to the grid 5. This is accomplished by varying the resistance 97 in the phase-shifting circuit of the diode 95. A similar control is provided for the third switch position in the variable resistance 110 in the circuit of the diode 107. By these latter adjustments it is possible to remove the beam-suppressing action at any desired time before the emission of the next signal impulse. In other words, the relative phases of the various frequencies represented in Fig. 6 can be shifted. In any case, however, the instant of emission of the signal impulse remains independently controllable.

The tube 37 is of the gaseous discharge type wherein the flow of current between the cathode and anode can be commenced with a given anode voltage only by applying a sufficiently positive voltage to the grid, but current flow having once commenced, will continue until the anode voltage is reduced to a relatively low value even though in the meantime the grid may have attained a potential below the critical potential required to initiate the discharge. This type of tube is used because not only is it relatively easy therewith to produce a high current discharge but also because it is unnecessary, in order to maintain the discharge, to continue to supply potential for a current flow between the grid and the cathode. Only a very small initial grid current need, therefore, be supplied and consequently very little power need be furnished by the control circuit. Most gaseous discharge tubes, however, have a relatively long deionization time which means that with decreasing anode voltage, the current flow through the tube will not rapidly fall to zero when a definite value of anode voltage is reached, but will too gradually taper off to zero even though the grid may have in the meantime been reduced to a potential below the critical potential. Such tubes are not satisfactory, but tubes with a deionization time short compared to the time between successive impulses should be chosen, e. g. a mercury vapor tube such as the type General Electric FG 67 which will deionize soon enough to give condenser 43 time to recharge fully before the next impulse is to be emitted. Also the internal resistance of the tube chosen must drop rapidly with beginning of discharge so that the discharge current will produce a steep wave front voltage impulse on the grid of the oscillator tube.

A further requirement of the system is that the impulse must always start within a time short compared to the time length of the impulse. This is necessary for accuracy since the time interval and the distance measurement is made from the beginning of the transmitted impulse to the beginning of the reflected impulse. The discharge in gaseous tubes, however, does not always start at precisely the same value of grid potential even with constant alternating potential, but there is always a range of grid potential somewhere within which the tube will be sure to fire. According to the present invention the necessary accuracy is obtained by sweeping the gaseous tube grid voltage through the region of critical grid potential within which discharge will commence within the required short time interval.

To make all this more clear consider a specific example. Let us assume that the keying frequency oscillator 9 is tuned to 5000 cycles. The grid of gaseous tube 37 will then become positive and render the tube conductive 5000 times per second. Similarly the oscillator will transmit to antenna 30 an impulse 5000 times per second. The time interval between successive impulses is therefore 0.0002 second. The cathode beam of indicator 1 for the switch position shown will then tend to move in a circular path at the rate of 5000 revolutions per second. Since electromagnetic waves travel approximately 186,000 miles per second, the maximum distance which can be measured is equal to a distance from the ranging apparatus corresponding to one half the distance travelled by a wave impulse in 0.0002 second or $$\frac{186000 \times 0.0002}{2} = 18.6 \text{ miles}$$

which will be the full scale calibration of scale 3. If the time length of the transmitted impulses be held to one microsecond, the nearest object from which a reflection can be indicated will be approximately 0.2 mile. To keep the possible error in the distance measurement below $\pm 0.05$ mile, each transmitted impulse must start at the same time in each measuring cycle within $\pm 0.000,000,5$ second. In other words, in accordance with the invention, it is necessary to sweep the gaseous tube grid voltage through the critical grid voltage region within which the tube may fire in not more than 0.000,001 second, or one microsecond. This is readily accomplished as above described. In fact, if the gaseous tube chosen will positively fire within a critical grid voltage range of, say, one volt and the 5000 cycle voltage has a maximum value of 250 volts, it can readily be shown that the tube will fire at the same instant in each cycle within much less than one microsecond. Assuming the keying voltage to be sinusoidal, we can write:

$$E_g = E \sin \omega t$$

where $E_g$ is the grid voltage, E is its maximum value, $\omega = 2\pi$ times the frequency, and $t$ is time in seconds. Differentiating, we find that a small element $\Delta E_g$ of the grid voltage is:

$$\Delta E_g = \omega E \cos \omega t \Delta t$$

Now, since for $E_g$ close to zero, $\cos \omega t = 1$, an element of grid voltage near zero $\Delta E_{g_0}$ will be $$\Delta E_{g_0} = \omega E \Delta t$$

Therefore $$\Delta t = \frac{\Delta E_{g_0}}{\omega E}$$

equals the time required for the grid voltage to traverse the element $\Delta E_{g_0}$.

Hence, under the above conditions where the critical grid voltage region $\Delta E_{g_0}$ is one volt, the maximum voltage E is 250 and the frequency is 5000 cycles per second, $$\Delta t = \frac{1}{2\pi \times 5000 \times 250} = 0.000,000,128 \text{ second}$$

Thus there results considerably less than the possible error of $\pm 0.05$ mile above specified. Therefore, alternatively, a lower voltage or a lower frequency may be used. In fact, the frequency may theoretically be reduced to 640 cycles with the specified accuracy. For a lower frequency, the maximum grid voltage must be increased if the required accuracy is to be obtained, or a discharge tube must be used whose critical grid voltage region is smaller than one volt.

Another way of increasing the accuracy of production of the keying impulse is to control the gaseous tube grid not by means of a sine wave, but by the use of some other periodic wave, which may be derived from the oscillator 9, and which has a higher rate of change in a positive direction than a sine wave of the maximum allowable magnitude. For example, a wave of the type shown in Fig. 5 could be used.

It will be understood that transmitting oscillators other than the particular circuit shown in the drawings can be used with my keying circuit. It should be noted, however, that in order to be able to receive and indicate impulses close in time to the transmitted impulses which may be reflected from nearby objects, it is necessary to keep the time length of the impulses short. This is a feature of the transmitting oscillator circuit shown in Fig. 1 due to the provision of bias battery 35 and resistor 34 which are adjusted to such values that the tube will stop oscillation within a time short compared to the time length of the impulse. Thus the keying impulse provided by the gaseous tube circuit will, due to its steep wave front, rapidly throw the transmitter tube 22 into oscillation and the transmitter tube, due to its bias adjustment, will rapidly stop oscillating when the current through the tube 37 stops.

These conditions may be visualized from Fig. 3 which is a graph wherein times are plotted as abscissae and signal intensities as ordinates. This graph is diagrammatic only and is not intended as a representation of accurate or even of relative values. The curve 57 indicates the sine wave frequency produced by the keying frequency oscillator 9. The curve 58 represents the envelope of the high frequency signal impulses produced by oscillator 22 in response to the keying impulses produced by the discharge of condenser 43 through the gaseous tube 37. The condenser discharge current may be somewhat as shown by the curve 59. As discussed above, the time interval $t_2$ between successive impulses 58 is maintained with a high degree of accuracy by the use of a gaseous discharge tube whereby a steep wavefront keying impulse is obtained and by sweeping the control grid voltage of the gaseous tube through its critical grid potential region in a time short compared to the time length $t_1$ of the signal impulse. The time length $t_1$ of signal impulse depends upon the time constant of the discharge circuit and upon the bias applied to the control electrode of the oscillator. To this end the oscillator grid 33 is biased sufficiently far negative so that it will not oscillate by bias battery 35 and bias resistor 34. When the steep-sided impulse 59 is applied to the grid 33 of the oscillator, the grid 33 is very rapidly driven positive to the point of oscillation and is maintained in the region of oscillation until the steeply descending side of the positive keying impulse 59 allows the bias supply 35 again to stop oscillation. Evidently, by adjusting either or both the discharge circuit time constant and the negative bias 35, the time length $t_1$ of the high frequency impulse may be adjusted. It is preferable to keep this time $t_1$ short so that objects close to the transmitter can be ranged. By this means it has been possible to produce high frequency impulses a fraction of a microsecond in duration.

My keying circuit described above can also be used with other types of high frequency oscillators. It may, for example, be used with an oscillator of the velocity modulated type such as is schematically shown in Fig. 7. In this type of oscillator an electron beam is produced by a cathode 120 within a sealed envelope 121. The cathode beam is controlled by a beam modulating element such as a grid 122 and passes through the center of a pair of doughnut-shaped resonators 123 and 124 to a collector 125. The normal path of the cathode beam is indicated by the dotted line 126 in Fig. 7. The passage of the cathode beam through the tube brings about high frequency oscillations within the resonators 123 and 124. These are connected to each other by a conductor 127 mounted concentrically within the tube 128. High frequency energy is conducted from the resonator 124 to the antenna by means of a similar shielded conductor 129. The beam modulating element 122 may be such as to bring about complete suppression of the cathode beam when biased below a critical potential and to permit passage of the beam at all higher potentials. The modulating element 122 may, therefore, be negatively biased by a battery 131 connected in series with resistance 132.

This oscillator replaces the oscillating circuit shown in Fig. 1 and may be connected to the keying circuit through condenser 89. If the beam modulating element is of the type which draws current, then a series resistance 133 should be included in the circuit to provide poor regulation so that the modulating element will not seriously reduce the beam current. On the other hand, if the modulating element is of the cylindrical focussing type sometimes used, the resistor 133 will be unnecessary, for then the beam will be turned full on within a critical range of voltage. My keying circuit then produces an impulse which passes through this range within a sufficiently short time to insure the necessary accuracy in the beginning of the high frequency signal impulse. Similarly the cathode beam will be turned off within a corresponding critical voltage range which is likewise swept through in the required short time by the descending side of my keying impulse. Thus, also, by the use of a velocity-modulated type of oscillator actuated by my keying circuit, high frequency impulses of the required accuracy of starting and stopping can readily be obtained.

Fig. 8 shows a modification of my keying circuit which is particularly valuable for use in connection with low impedance circuits, for example, for keying an oscillator which has a low impedance at the keying point. The charging resistor 41 in Fig. 1 serves two purposes: First, it enables the condenser 43 to be charged from the direct current source; second, when the gaseous tube 37 discharges, the resistor 41 serves to prevent the charging voltage from maintaining ionization in the gaseous tube. Thus, there is a definite limit to the size of condenser 43 which can be used, and a corresponding limit to the power in the keying impulse which is obtained; for if the size of the condenser be increased, the magnitude of the charging resistance must be decreased in order to charge the condenser fully within the desired short time interval between successive impulses. This reduced magnitude of the charging resistance may, however, prevent the gaseous tube from deionizing.

As shown in Fig. 8 a larger condenser can, however, be used and a larger impulse obtained without sacrifice either of accuracy or of rapidity of the pulses by using a triode vacuum tube 120 in place of the charging resistor. The tube 120 has its anode connected to the positive side of the direct current supply and its cathode to the condenser 43. The grid of the triode is excited from the same source as the grid of the gaseous discharge tube 37, but with a phase reversal of 180°. To this end the grid and cathode of tube 120 are connected across an additional secondary winding 121 provided on transformer 20. It will be evident now that the grid of the triode 120 will be positive while the grid 39 of the gaseous tube 37 is negative. The triode 120 therefore acts as a low impedance during this period for the passage of charging current for the condenser 43. On the other hand, when the grid 39 becomes positive, resulting in the discharge of condenser 43 through the tube 37, the grid of the triode 120 will be negative so that the triode acts as a high impedance between the condenser-charging source and the gaseous tube 37. The gaseous tube consequently has ample time to deionize before the condenser-charging cycle again begins.

It will be understood by those skilled in the art that the triode 120 may be used either in the positive side or the negative side of the line. Otherwise than as described, the circuit of Fig. 8 is the same as that shown in Fig. 1, the load to which the keying impulse is to be applied being connected between the cathode 38 and the ground with the interposition of the blocking condenser 89.

An example of its use on the negative side of the line is shown in Fig. 9. This arrangement also has some further advantages. In this case the triode 120 has its cathode connected to the negative side of the charging source and its anode connected to the condenser 43. The grid cathode circuit of the triode is again connected to an additional secondary winding 121 on the transformer 20 in a polarity to be 180° out of phase with the grid of the gaseous tube 37. The load resistor 44 is, however, connected between the condenser 43 and the anode 40 of the gaseous discharge tube 37 and the load is connected between the junction of the condenser 43 and the resistance 44 and ground with the interposition of blocking condenser 89. In this modification as in Fig. 8 the tube 120 presents a low impedance during the charging time of condenser 43 but acts as a high impedance during the discharge of the condenser 43 through the gaseous tube 37. It will be noted, however, that in this case any capacitance which may exist between the cathode 38 of the gaseous tube and ground, as indicated dotted at 122, will now be outside of the condenser discharge circuit. This is of particular importance when the maximum possible magnitude of the keying impulse is required.

Having now described my invention, I claim:

1. In combination, a velocity modulated electron oscillator for producing high frequency oscillations and having a control element for turning the electron beam on and off in response to an applied potential, and a keying circuit for said oscillator for the production by the latter of accurately timed discrete periodic impulses including a grid-controlled gaseous discharge tube having a region of critical grid potential within which, for a given anode potential, discharge will occur, a condenser, means for charging the same, a resistance connected in series with said condenser and the anode discharge path of said tube, and means for periodically applying to the grid of the tube a potential increasing at a rate to pass through said critical grid potential region in not substantially more than one microsecond, and means for deriving a potential from the condenser discharge current and applying the same to said oscillator control element.

2. A circuit for periodically producing electric impulses including a grid-controlled gaseous discharge tube, means periodically applying to the tube potentials for making the tube alternately conductive and non-conductive, a condenser connected in the discharge path of said tube and adapted to be discharged through said tube and means for charging said condenser only while said discharge tube is non-conductive.

3. A circuit for periodically producing electric impulses including a grid-controlled gaseous discharge tube, means applying to the control grid an alternating potential for making the tube conductive in positive half cycles of said potential, a condenser connected in the discharge path of said tube and adapted to be discharged through said tube, a source of condenser charging current, a unidirectional conductive device having a control electrode, means connecting said device between said condenser and said charging source and means connecting said control electrode to said alternating potential source for making said device conductive only during the negative half cycles of said potential.

4. A circuit for periodically producing electric impulses including a grid-controlled gaseous discharge tube, means applying to the control grid an alternating potential for making the tube conductive in positive half cycles of said potential, a condenser connected in the discharge path of said tube and adapted to be discharged through said tube, a direct current source connected to said condenser for charging the same and electric valve means between said condenser and the negative terminal of said direct current source and controlled by said alternating potential for limiting the charging of said condenser to periods when said discharge tube is non-conductive.

HAROLD M. HART.